United States Patent
Bricaud et al.

[11] Patent Number: 5,823,828
[45] Date of Patent: Oct. 20, 1998

[54] SMART CARD CONNECTOR WITH SLIDABLE COVER

[75] Inventors: Herve' Guy Bricaud, Dole; Fabrice Valcher, Damparis; Yves Pizard, Dole, all of France

[73] Assignee: ITT Manufacturing Enterprises, Inc.

[21] Appl. No.: 763,285

[22] Filed: Dec. 10, 1996

[30] Foreign Application Priority Data

Dec. 13, 1995 [FR] France .................................. 95 14767

[51] Int. Cl.⁶ ................................................. H01R 23/70
[52] U.S. Cl. ............................................................. 439/630
[58] Field of Search ..................... 439/630, 377, 439/325, 326, 377.2; 235/441

[56] References Cited

U.S. PATENT DOCUMENTS 5,231,274  7/1993  Reynier et al. ......................... 235/441
5,257,414  10/1993  Trahan et al. ............................. 455/90
5,276,317  1/1994  Ozouf et al. ............................. 235/441

FOREIGN PATENT DOCUMENTS 2131665  9/1994  Canada .

Primary Examiner—Neil Abrams
Assistant Examiner—Barry M. L. Standig
Attorney, Agent, or Firm—Thomas L. Peterson

[57] ABSTRACT

An electrical connector 12 is provided for receiving and contacting pads on a smart card C, the connector including a molded dielectric support 14 that forms a card-holding recess 22, and a cover 52 that holds down the card against contacting ends 40 of contacts mounted on the support. When the card is fully inserted into the recess, with a rear edge 32 of the card abutting a recess rear wall 30, the front edge 50 of the fully inserted card projects forward of the recess front end 24, to provide a forwardly-projecting card portion that can be readily gripped to pull out the card. The cover 52 has depending sides 61 with lower ends 63 that project towards each other, so the cover can be slid in place around the support. The forward end 56 of the cover can lie rearward of the recess rear end.

7 Claims, 4 Drawing Sheets

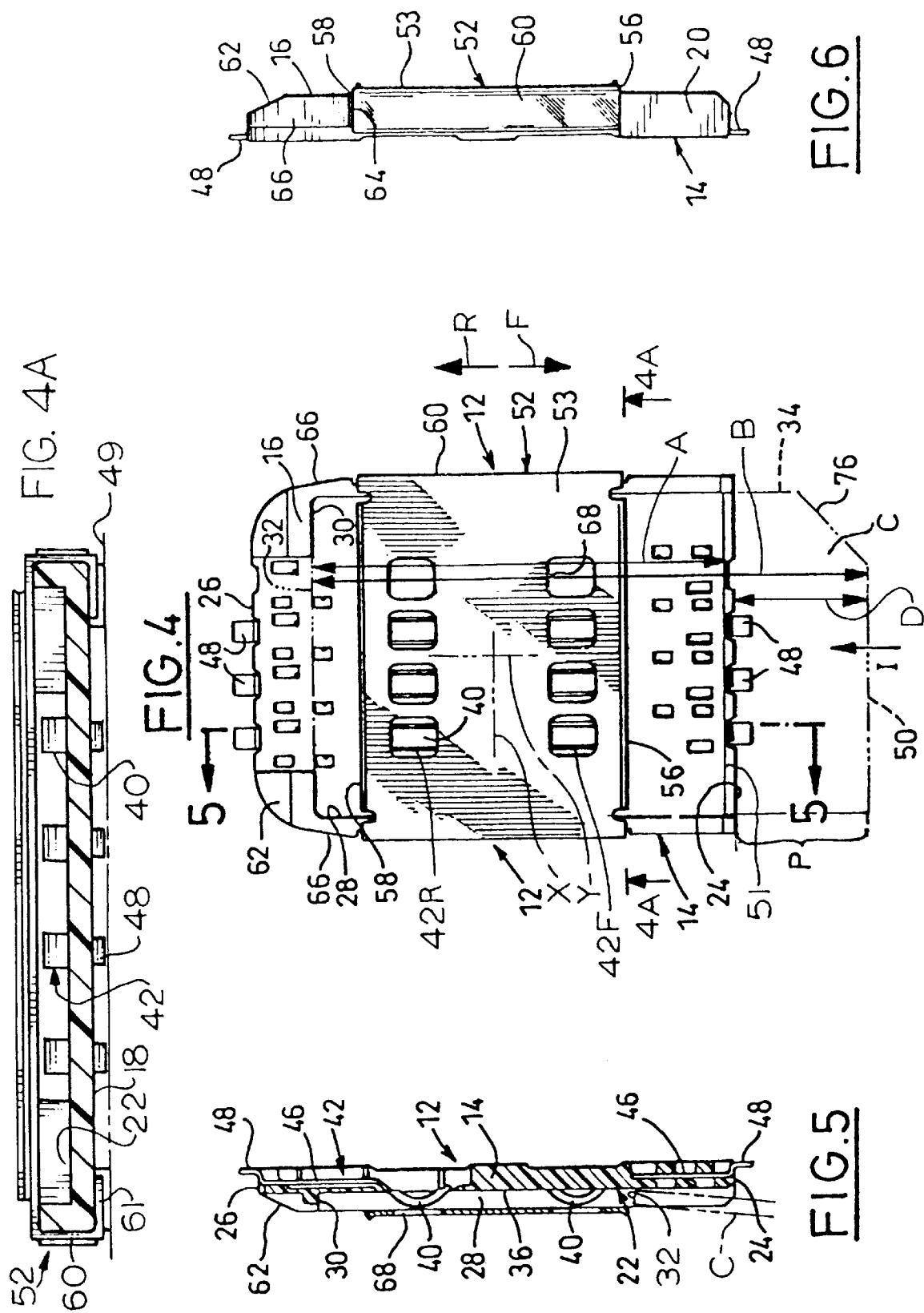

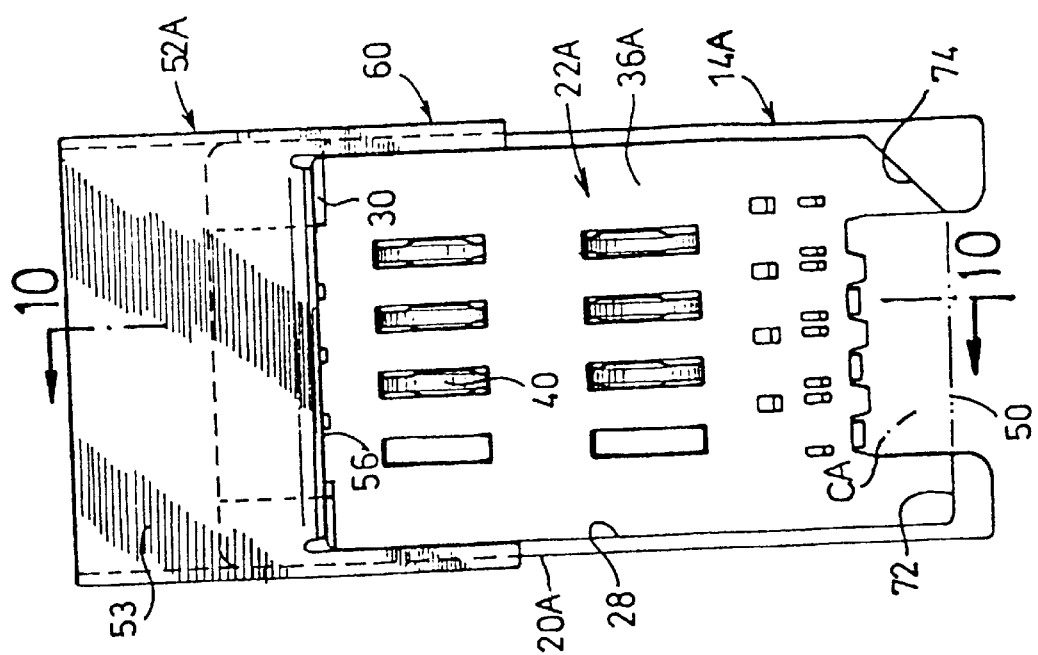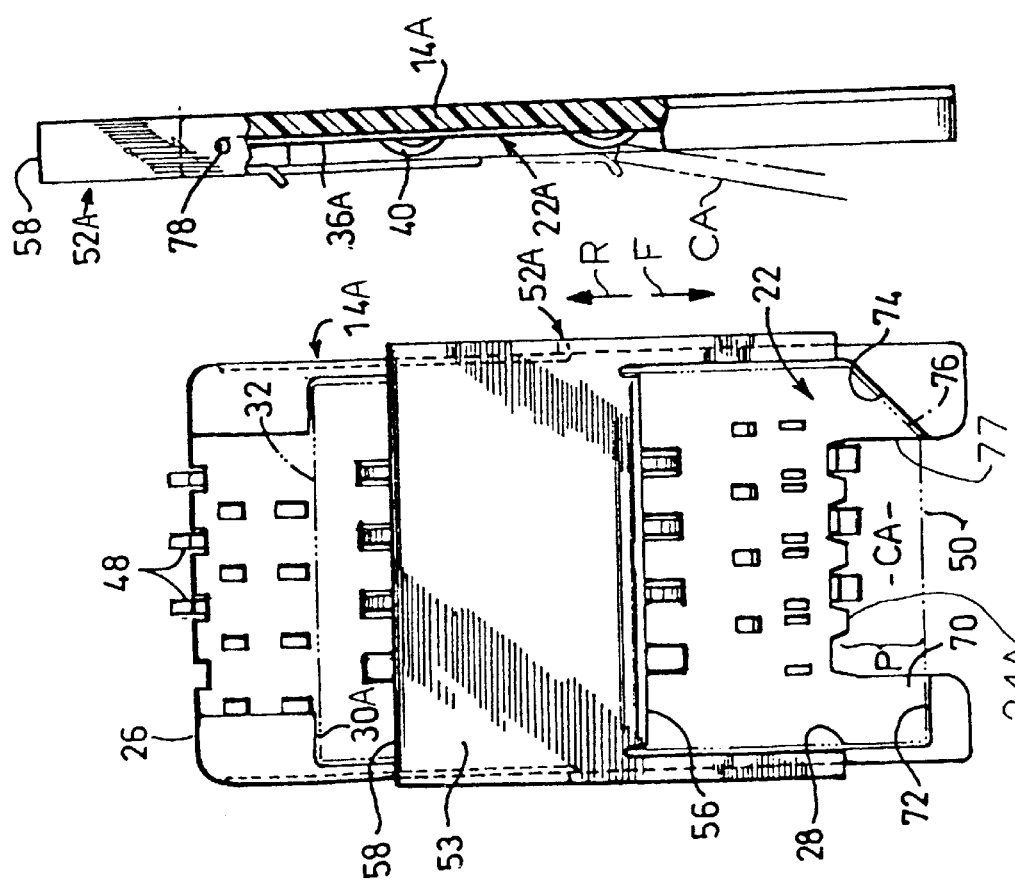

5,823,828

SMART CARD CONNECTOR WITH SLIDABLE COVER

BACKGROUND OF THE INVENTION

Signals are read into and out of smart cards by a connector with contacts that engage contact pads on a face of the card, with the contacts connected to a read/write circuit. It is desirable to minimize the size of the connector, especially when the card is a small-size card which is referred to as a SIM card that is commonly used in telephones and radios. Of course, the connector must assure reliable connection to the card while allowing the card to be easily installed and removed from the connector.

U.S. Pat. No. 5,226,826 describes a connector having an insulative support that holds contacts and that pivotally supports a card-receiving cover. The cover can pivot between an open position where the card can be installed and removed, and a closed position in which the card is pressed against the contacts. Such a design is relatively complex, because it requires means for pivotally supporting the cover and means for locking the cover in the closed position. Also, this design cannot be used where there is insufficient space to allow the cover to pivot.

One type of electrical connector has an insulative support having a card-receiving recess in its upper face. With the card fully installed, removal of the card requires the use of an extraction pusher. The many components of this design make it unreliable and expensive. The present invention provides an electrical connector, which avoids the above disadvantages.

SUMMARY OF THE INVENTION

In accordance with one embodiment of the present invention, a smart card electrical connector is provided which is of simple, reliable, and compact construction. The connector has a card-holding recess with a front end that lies rearward of the front end of the fully inserted card. This results in the card having a front part projecting forwardly out of the housing, which makes the card easier to grasp to pull it out of the connector as well as to install it.

In one card, the walls of the card-receiving recess include a pair of forwardly-extending side projections that leave a slot between them, in which the card can be grasped and pulled out.

The connector includes a cover for holding the card in the recess. The cover has an upper plate that pushes down the upper face of the card, and has opposite sides that extend around opposite sides of the support and that allow the cover to be slid into position and held to the support. The cover can be shorter than the support, with the front end of the cover lying rearward of the front end of the recess. This allows a card to be installed by laying the rear edge of the card in the front of the recess and then sliding the card rearwardly along the recess and under the cover.

In one construction, the cover is slidable in use of the connector, between a closed cover position in which the cover extends above the card—holding recess to push down the card, and an open position which allows the card to be moved into the recess. A sheet metal cover can have a series of holes which, in the closed position of the cover, lie directly above the contacting ends of the contact elements. The holes enable testing of the contacts by probes projecting through the holes. The holes also avoid direct engagement of the contacts with the sheet metal cover.

The novel features of the invention are set forth with particularity in the appended claims. The invention will be best understood from the following description when read in conjunction with the accompanying drawings.

BRIEF DESCRIPTION OF THE DRAWINGS

FIG. 4 is a plan view of the connector of FIG. 1, with the cover in its assembled position and with the card illustrated in phantom lines.

FIG. 4A is a view taken on line 4A—4A of FIG. 4.

FIG. 5 is a sectional view taken on line 5—5 of FIG. 4.

FIG. 6 is a side view taken from the left side of the connector of FIG. 4.

FIG. 8 is a plan view of the connector of FIG. 7, with the cover in the closed position for holding a card in place, and with the card being shown in phantom lines.

FIG. 9 is a view similar to that of FIG. 8, but with the cover in the retracted or open position, for installation or removal of the card.

FIG. 10 is a partially sectional view taken on line 10—10 of FIG. 9.

DESCRIPTION OF THE PREFERRED EMBODIMENTS

Figure 1:
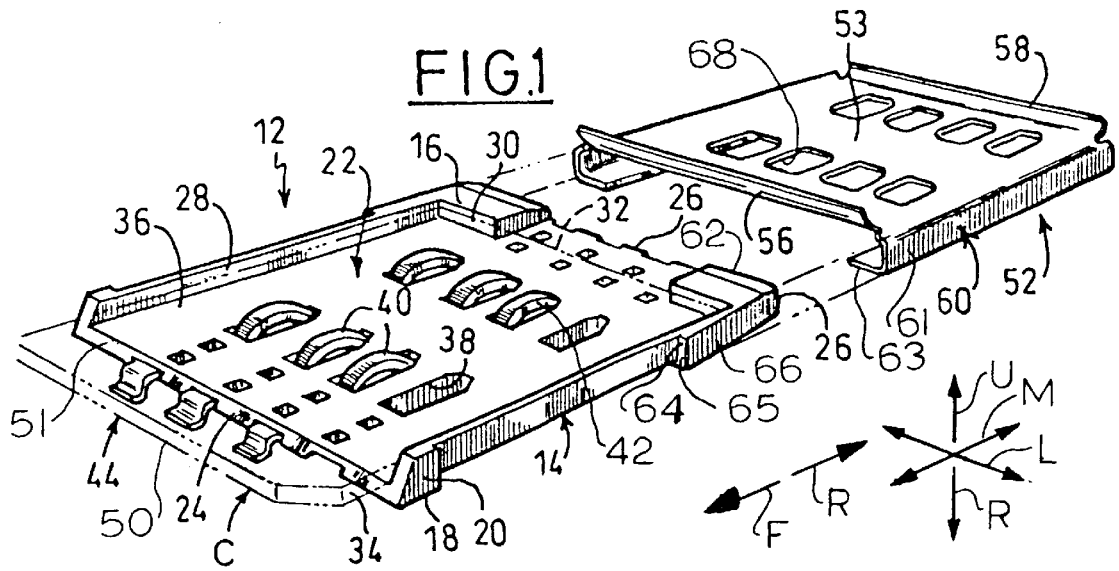
FIG. 1 is an exploded perspective view of an electrical connector constructed in accordance with the present invention, and showing an installed card in phantom lines.
Figure 2:
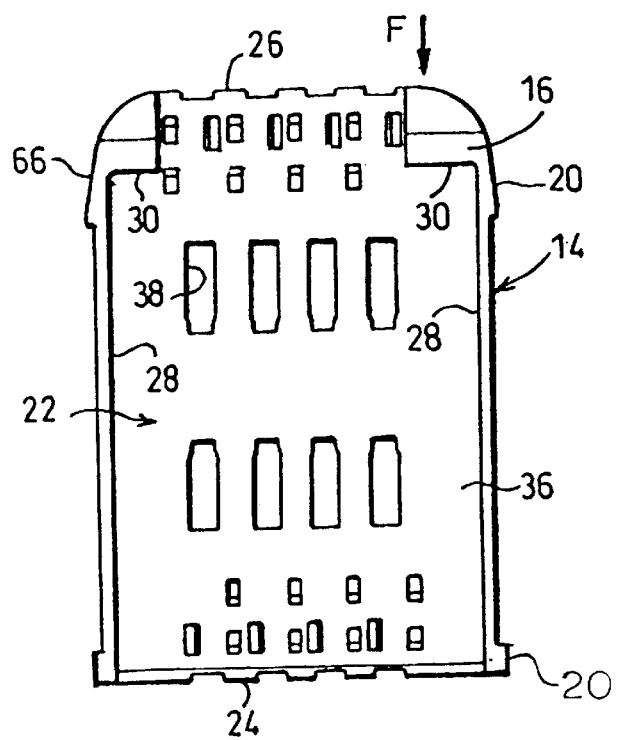
FIG. 2 is a plan view of the support of the connector of FIG. 1.
Figure 3:
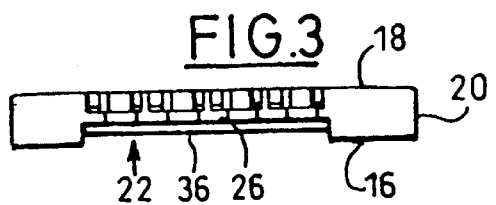
FIG. 3 is a view taken along the direction of arrow F3 in FIG. 2 and showing the support upside-down from the orientation of FIG. 1.

FIG. 1 shows an electrical connector 12 which includes a support 14 molded of insulating, or dielectric material. The support is generally of a rectangular plate-like shape, with upper and lower planar faces 16, 18. The support has laterally (arrow L) opposite sides 20, a front end 24, and a rear end 26. The support forms a recess 22 for receiving at least part of an electronic memory card, or smart card C. The support forms recess walls, including laterally opposite side walls 28, a rear wall 30, and a bottom wall 36. The recess has a front end 51 that lies adjacent to the front end 24 of the support, the front end of the recess being open. It is noted that the rear wall 30 has a gap in it.

The recess rear wall 30 forms a stop that abuts the rear edge 32 of the card C in the fully installed position of the card. The lateral position of the card in a recess is defined by the recess side walls 28 which substantially engage the opposite side edges 34 of the card.

A plurality of electrical contacts 42 are mounted on the support 14. The contacts have connecting or card engaging ends 40 which project upwardly (arrow U) through windows 38 in the horizontal face or bottom wall 36 of the recess. The card C has contact pads on its lower face 44 which engage the card engaging ends 40 of the contacts when the card is fully installed. Each electrical contact 42 may be of the design shown in document WO-A95/18,421.

Each contact 42 is substantially in the form of a blade or strip with a central part 46 (FIG. 5) mounted on the support 14. Each contact has a card engaging end 40 which contacts a card pad, and has a terminal end 48 for connection to a processing circuit of a read/write device. The connection ends 48 are preferably soldered to traces of a circuit board (49 in FIG. 4A) that supports the connector.

As shown in FIG. 4, the terminal ends 48 of the rearward row 42R of contacts extend rearwardly beyond the rear end 26 of the support, while the terminal ends of the front row 42F of contacts extend forwardly of the front end 24 of the support. This construction facilitates access to the terminal ends 48 for soldering them to the circuit board.

In accordance with one aspect of the invention, the longitudinal length A of the recess, between the rear wall 30 and the recess front end 51, is less than the longitudinal length B of the card C. As a result, the fully inserted card is positioned with its front end 50 lying a plurality of millimeters forward of the recess and of the front end 24 of the support. This results in a forwardly-projecting part P of the card, having a length of a plurality of millimeters, available to grip the card to ease card removal and card insertion. The length of the forwardly projecting part P of the card is long enough to make it easy to grip and to avoid the users fingers from coming into contact with the terminal ends 48 of the forward row of contacts. For a smart card C having a length B of 40 mm, the length of the projection P is about 10 mm.

In a fully installed position of the card C, the card front end 32 abuts the recess wall 30 and its sides lie closely beside the recess side walls 28. However, the card must be pressed down into the recess, to assure that its contact pads firmly engage the contacting ends 40 of the contacts.

To assure that the card C is properly held in the recess, the connector 12 is provided with a cover 52 that can hold down the card. The cover 52 is formed of cut and folded sheet metal. It includes an upper plate 53 which lies above the card and that presses facewise downwardly against the upper face of the card. In particular, the cover 52 presses down against the portion of the card that engages the contact card-engaging ends 40.

The cover has a top plate 53 with a front end 56 that lies a plurality of millimeters rearward of the front end 51 of the recess and the front end 24 of the support. The cover also has a rear end 58 that lies forward of the rear wall 30 of the recess. The card can be installed as shown in FIG. 5, by laying the card front end 32 in the front portion of the recess, with the card lying at a large incline (over 5° and usually over 10°) to the horizontal plane of the recess bottom wall 36. The card can then be pivoted facewise against the recess bottom wall 36 while being pushed into its final position.

The short cover 52 is preferably symmetrical about lateral and longitudinal axes X, Y (FIG. 4). The short symmetrical cover saves material and helps automate connector assembly. The cover 52 may be made longer so its front end 56 lies almost directly over the front end 24 of the support, which provides greater protection to the contact contacting ends 40, although requiring the initially inserted card to lie close (less than 5°) to parallel to the recess.

The cover 52, shown in FIG. 1, includes two feet 60 depending from laterally opposite sides of the cover top plate 52. Each foot has a side 61 extending downwardly from the top plate and has a bottom 63 extending laterally toward the other foot. The cover can be slid forwardly (F) onto the support, with the feet 60 resiliently separating until the feet snap into notches 64 formed in the sides of the support. The rear of the support has chamfer surfaces 62 and ramp surfaces 66 that facilitate such cover installation. The notches 64 have ends 65 and have substantially the same length as the cover feet, to minimize "rattling" of the cover.

The cover upper face 53 has two rows of holes 68 which lie directly above the card-engaging ends 40 of the contacts, when the cover is installed on the support. The presence of the holes makes it possible to perform an electrical test operation to check the proper connection of the connector, without having to remove the cover, by projecting electrical probes through the holes. Also, when no card is in the connector, the presence of the holes 68 makes it possible to avoid short-circuiting the contacts through the cover, in cases where such short-circuiting before a card is installed, is desirable. The cover is of small thickness, except that its forward end 56 is preferably bent upwardly to facilitate reception of a card in the recess.

FIGS. 7–10 illustrate another embodiment of the invention, wherein the cover 52A is slid longitudinally (M) during the usual use of the connector. The insulative support 1 4A has a recess 22A with front recess walls 72, in addition to the rear recess walls 30A. This prevents the card CA (with contact pads 73) from being slid into its final position by sliding its lower face in the plane of the recess bottom wall 36A. Instead, the card must be at least partially moved downwardly into the recess. It is noted that the recess front wall 72 has one side with a polarizing edge 74, which is designed to receive the polarizing corner 76 (FIG. 8) of the card. The edge 74 is inclined at about 45° for common SIM cards, which have a length of about four centimeters. However, the front of the support 14A is provided with a slot 77 at its lateral middle, to enable a person to grasp the front end of the card to help install and remove it. The lateral middle front end portion 24A of the bottom wall lies a plurality of millimeters rearward of the recess front wall 72.

Figure 7:
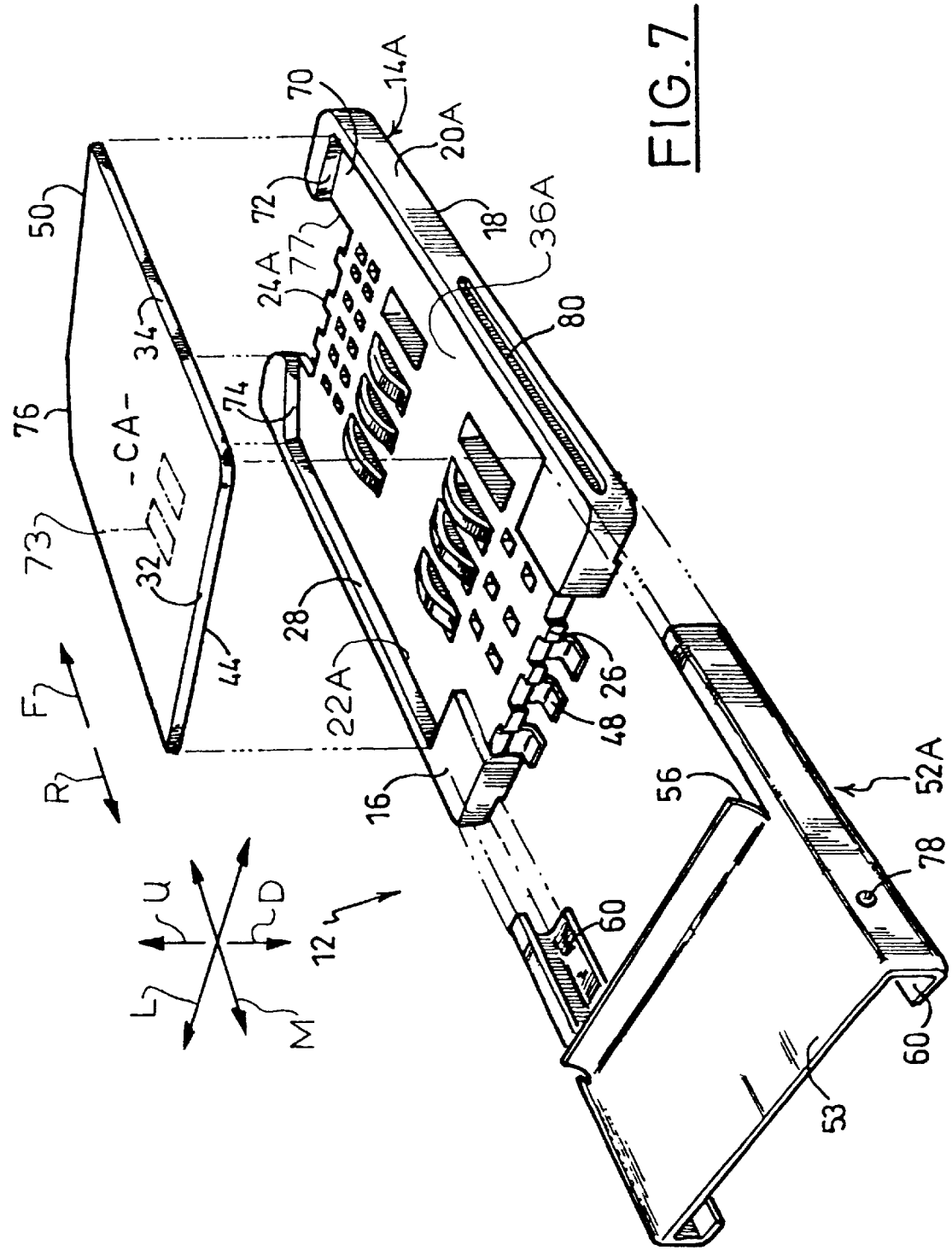
FIG. 7 is an exploded perspective view of an electrical connector of a second embodiment of the invention, wherein the cover is slidable in use.

The cover 52A is mounted to slide between its closed position shown in FIG. 8, and its open position shown in FIG. 9 and 10. In FIGS. 9 and 10, substantially the entire upper end of the recess 22A is open. This allows the card to be installed by merely moving it downwardly into place. FIG. 7 shows that the cover 52A is provided with an inwardly-extending boss or projection 78 at each of its side feet, which are received in grooves 80 in the opposite sides 20A of the support. The projections 78 serves as stops that limit forward and rearward sliding of the cover. The projections also help to avoid removal of the cover from the support, and are especially desirable when the cover is slidable in use.

Although the card can be more easily installed when the cover is in the open position of FIG. 9, the card also can be positioned by initially orienting it at a slight angle, as shown at CA in FIG. 10, and pushing the card forwardly, while slightly bending it, until the card lies fully within the recess.

Although the connector can be mounted on a circuit board of a read/write device, it also can be mounted within an electronic memory card or IC card of the "PCMCIA" type, which is designed to fit into a slot that has multiple contacts at the deepest end of the slot. This allows a smart card, which is generally less than 1 mm thick and which can be carried in a wallet, to be connected to circuitry in an electronic device that has a slot designed for receiving a PCMCIA type IC card which may have a thickness such as 5 mm.

While the support with the card-receiving recess is shown as having a cover mounted thereon, it is also possible to place the support in an electronic device which has a separate wall that holds down a card in the recess. One example is a removable accumulator battery with a face that can hold down the card.

While terms such as "top", "bottom", etc have been used to describe the invention as illustrated, it should be understood that the connector can be used in any orientation with respect to the Earth.

Thus, the invention provides an electrical connector of simple and reliable construction, for receiving and connecting to contact pads of a smart card. The connector includes a support with walls forming a recess for receiving the card in a position wherein the rear of the card abuts a rear wall of the recess. The length of the recess is such that the front portion of the card, at least at the middle of the card, is unobstructed so a person can place his thumb and forefinger respectively above and below the card front portion, to pull out the card. The connector preferably has a sheet metal cover with a top plate that holds down the card against contacting ends of contacts, and that has feet at its laterally opposite side, with lower ends that extend toward each other so the cover can be slid into place and thereafter holds itself in place.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector (12) for mounting on a circuit board (49) and for connecting to a primarily rectangular smart card (C) that has a card lower face with card contact pads thereon, card front and rear edges (50, 32), and a predetermined length B between said edges, comprising:

an insulative support (14) which has walls forming a card holding recess (22) with an open upper recess top, said recess walls including a bottom wall (36), opposite recess side walls (28), and a recess rear end wall (30);

a plurality of contacts (42) mounted on said support, said contacts having card engaging ends (40) projecting above said bottom wall and positioned to engage said card contact pads when said card lies in said recess with said card rear edge abutting said recess rear end wall, with said contacts having terminals (48) for connecting to said circuit board;

said bottom wall has a bottom wall front end (51) lying at a front end of said recess, with said bottom wall front end positioned so when said card rear edge abuts said recess rear end wall said card front edge (50) projects a plurality of millimeters forward of said bottom wall front end and of said contacts, and with an area above and forward of said bottom wall front end being uncovered, to thereby enable the card front end to be gripped not only above but also below the card to pull out the card.

2. The connector described in claim 1 wherein:

said support has laterally opposite sides with notches therein; and including:

a sheet metal cover having an upper plate lying closely over said recess, said upper plate having laterally opposite sides and having feet depending therefrom, each foot having a cover side that extends downwardly beside one of said support side walls and a lower end that extends laterally toward the opposite foot, said feet being resiliently deflectable apart to enable them to spread apart until they are received in said notches to enable installation of said cover on said support.

3. The connector described in claim 2 wherein:

said feet are longitudinally slidable on said support to allow said cover to slide thereon during connector use.

4. A smart card connector for holding a smart card of predetermined size that has a lower face with card pads, comprising:

a support that has opposite support sides, and that has a top with a card-receiving recess for holding said card, said recess having a bottom wall, a rear wall, and opposite side walls;

a plurality of electrical contacts mounted on said support and having card-engaging ends projecting through said recess above said bottom wall;

a sheet metal cover having an upper plate lying immediately above said recess to hold down the card so the card pads firmly engage the contact contacting ends;

said support sides having notches therein;

said upper plate having laterally opposite sides and having feet depending therefrom, each foot having a cover side that extends downwardly beside one of said support side walls and a lower end that extends laterally toward the opposite foot, said feet being resiliently deflectable apart to enable them to spread apart until they are received in said notches.

5. The connector described in claim 4 wherein:

said recess has a front end with an upstanding recess front wall (72) lying at a lateral side of said recess front end, but with the lateral middle (24A) of the recess front end lying rearward of said recess front wall.

6. A smart card connector for holding a smart card of predetermined size that has a lower face with card pads, comprising:

a support that has opposite support sides, and that has a top with a card-receiving recess for holding said card, said recess having a bottom wall, a rear wall, and opposite side walls;

a plurality of electrical contacts mounted on said support and having card-engaging ends projecting into said recess above said bottom wall;

a cover having an upper plate lying immediately above said recess to hold down the card so the card pads firmly engage the contact contacting ends;

said upper plate having laterally opposite sides and having feet depending therefrom which are slidable on said support to allow said cover to slide in forward and rearward directions on said support.

7. The connector described in claim 6 wherein:

said recess has a front end with an upstanding recess front wall (72) lying at a lateral side of said recess front end, but with the lateral middle (24A) of the recess front end lying rearward of said recess front wall, and with said front wall having a rearwardly-facing surface that prevents the card from moving forwardly until a front end of the card is lifted.

* * * * *